United States Patent
van Hook et al.

(10) Patent No.: US 6,567,426 B1
(45) Date of Patent: May 20, 2003

(54) PREEMPTIVE TIMER MULTIPLEXED SHARED MEMORY ACCESS

(75) Inventors: Timothy J. van Hook, Atherton, CA (US); Gulbin Ezer, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/035,687

(22) Filed: Mar. 5, 1998

(Under 37 CFR 1.47)

(51) Int. Cl.[7] ................................................... H04J 3/04
(52) U.S. Cl. ...................................... 370/535; 370/438
(58) Field of Search ............................... 370/535, 401, 370/402, 412, 419, 413, 415, 462, 404, 421, 423, 424, 438, 451, 458, 459; 711/100, 105, 109, 145, 147, 169; 714/9, 10; 710/22, 23, 124

(56) References Cited

U.S. PATENT DOCUMENTS

| | | | | |
|---|---|---|---|---|
| 5,623,628 A | * | 4/1997 | Brayton et al. | 711/141 |
| 5,682,484 A | | 10/1997 | Lambrecht | |
| 5,745,732 A | * | 4/1998 | Cherukuri et al. | 711/168 |
| 5,822,767 A | * | 10/1998 | MacWilliams et al. | 711/146 |
| 6,073,251 A | * | 6/2000 | Jewett et al. | 714/7 |

* cited by examiner

*Primary Examiner*—Douglas Olms
*Assistant Examiner*—Phirin Sam
(74) *Attorney, Agent, or Firm*—Wagner, Murabito & Hao LLP (57) ABSTRACT

The present invention is directed to a method and system for sharing a data memory among a plurality of processors in a computer system. In the system and method of the present invention, a plurality of processors are coupled to a data memory for accessing the data memory in N-bit bandwidth. The present invention receives an active signal for accessing the data memory from the plurality of processors. A processor requesting accessing to the data memory asserts an active signal. Among the processors asserting active signals, a processor is selected as a memory master to the data memory. The present invention then transfers the N-bit wide data between the selected processor and the data memory in a time slot defined by a clock cycle. Only one processor is allowed access to the data memory during a given time slot. In the preferred embodiment of the present invention, the N-bit bandwidth is large enough to accommodate the data requirements of all the processors.

23 Claims, 7 Drawing Sheets

PREEMPTIVE TIMER MULTIPLEXED SHARED MEMORY ACCESS

FIELD OF THE INVENTION

The present claimed invention relates to the field of processor memory systems. More particularly, the present claimed invention relates to a processor architecture with a single memory unit that is shared among multiple processors.

BACKGROUND ART

Today's computer systems generally rely on auxiliary processors with dedicated memory units to perform various specialized tasks. In media processing in particular, the latest consumer entertainment applications utilize media processors to process video, audio, and graphics data for playing games, video and sound recordings, educational software, and the like. For example, in addition to its general media processor, a computer may include specialized processors such as a graphics processor for processing graphics data, an MPEG video decoder for decoding MPEG video data, an MPEG audio decoder for decoding MPEG audio data. Each of these specialized processors (i.e., units) typically have its own dedicated logic and memory resources. Hence, each processor adds a data memory and supporting logic circuitry to the computer.

Figure 1:
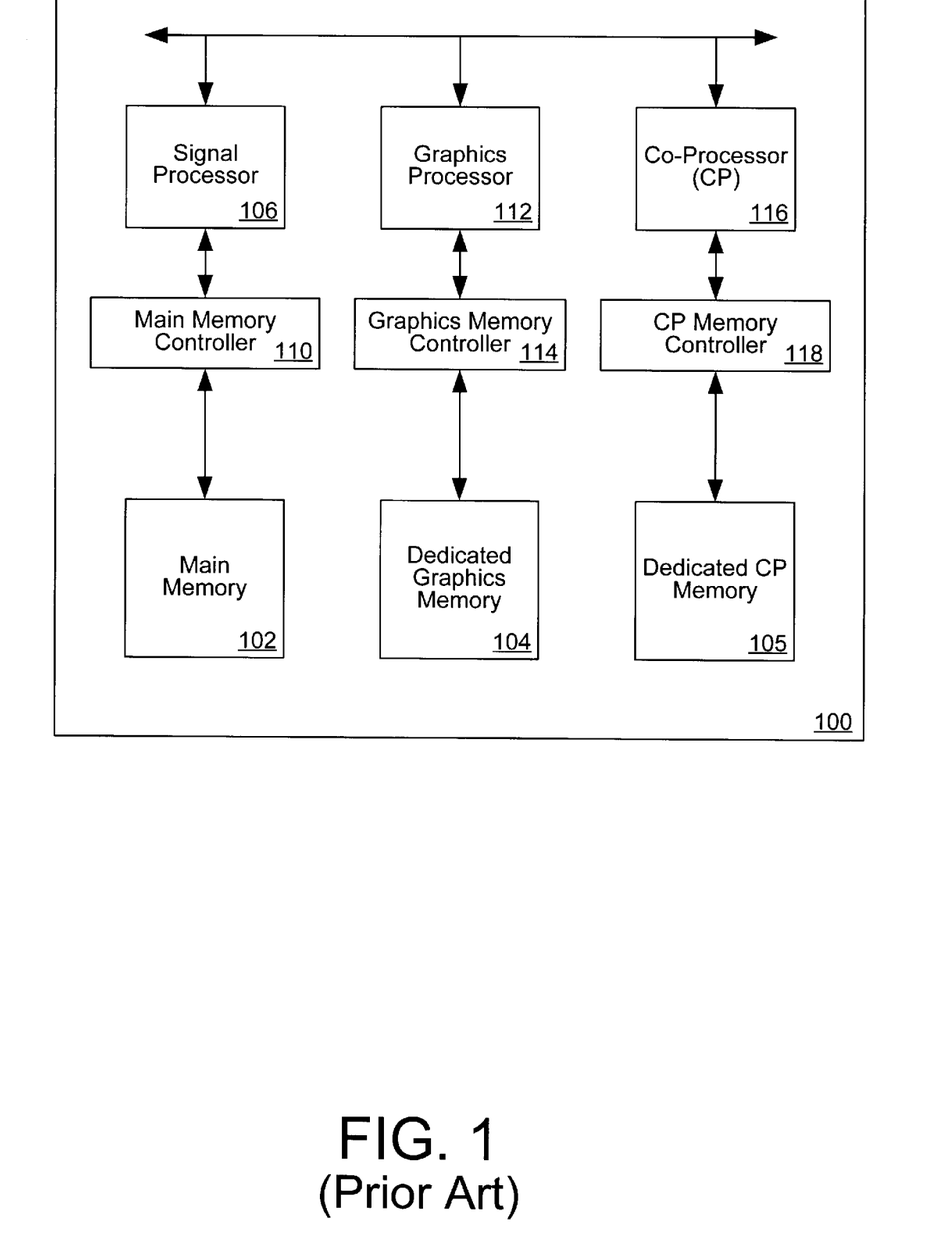
FIG. 1 illustrates a computer system comprised of processors with dedicated memory units.

Prior Art FIG. 1 illustrates an exemplary computer system 100 comprised of processors with dedicated memory units. The computer system includes three separate memory units; a main memory 102, a dedicated graphics memory 104, and a dedicated co-processor memory 105. The main memory 102 provides fast access to data for the signal processor 106 through a main memory controller 110. The dedicated graphics memory 104 provides fast access to graphics data for a graphics processor 112 via a graphics memory controller 114. Also, the dedicated co-processor memory 105 provides fast access to data used by a co-processor 116 via a co-processor memory controller 118. In this system configuration, the signal processor has read/write access to the main memory 102 but not to the dedicated graphics memory 104 or dedicated co-processor memory 105. Similarly, the co-processor has read/write access to the dedicated co-processor memory 105, but not to the main memory 102 or dedicated graphics memory 104. Likewise, the graphics processor 112 has read/write access to the dedicated graphics memory 104 but not to the main memory 102 or dedicated co-processor memory 105.

Unfortunately, these dedicated memories and controllers for each processing unit lead to duplication of resources due to variations in compute loads of the processors and inefficient use of valuable die area in integrated chips. For example, in one moment, a user may be watching a movie on the computer. The video processing involved in playing a movie usually entails only video and audio processing. The graphics processor remains idle during this time. Conversely, the user may be playing a game on the computer. Playing a game typically requires no video processing. Only the graphics processor and audio processor may be involved in processing the data for playing the game. This means that whenever a processor is idle or inactive, its dedicated memory is not being utilized. Since the unused memory typically occupies a die area in a chip, it translates directly into costs because it is burdening the chip during the idle times.

Furthermore, some computer applications require that a processor operate on data stored in the main memory or in one of the other dedicated memory units. Whenever data stored in one particular memory unit is to be processed by a designated processor other than the processor which has access to that particular memory unit, the data must be transferred to a memory unit for which the designated processor has access. For example, certain image processing applications require that data, stored in main memory or dedicated graphics memory, be processed by the image processor. In order to enable image processor to access data stored in; main memory or in dedicated graphics memory, the data must be transferred or copied to dedicated image processor memory.

Thus, what is needed is a low cost processor architecture with a single memory unit that can be shared among a number of processors while ensuring real time performance for each processor.

SUMMARY OF THE INVENTION

The present invention is directed to a method and system for sharing a data memory among a plurality of processors in a computer system. In the system and method of the present invention, a plurality of processors are coupled to a data memory for accessing the data memory in N-bit bandwidth. The present invention receives an active signal for accessing the data memory from the plurality of processors. A processor requesting accessing to the data memory asserts an active signal. Among the processors asserting active signals, a processor is selected as a memory master to the data memory. The present invention then transfers the N-bit wide data between the selected processor and the data memory in a time slot defined by a clock cycle. Only one processor is allowed access to the data memory during a given time slot. In the preferred embodiment of the present invention, the N-bit bandwidth is large enough to accommodate the data requirements of all the processors.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

The present invention describes a preemptive time multiplexed shared memory access system and method, examples of which are illustrated in the accompanying drawings. In the system and method of the present invention, a plurality of memory clients (i.e., processors) are coupled to a data memory (DMEM) and are capable transferring an N-bit word to or from the data memory in a single clock cycle (i.e., time slot). Only one processor is allowed access to the data memory for a given time slot. In the present invention, the behavior of all the processors is deterministic, that is, the data transfer characteristics and active states of the processors are known in advance. From these deterministic characteristics, an access contention logic is developed and implemented. In a preferred embodiment, a processor accesses the data memory at a bandwidth of 128 bits per time slot.

Figure 2:
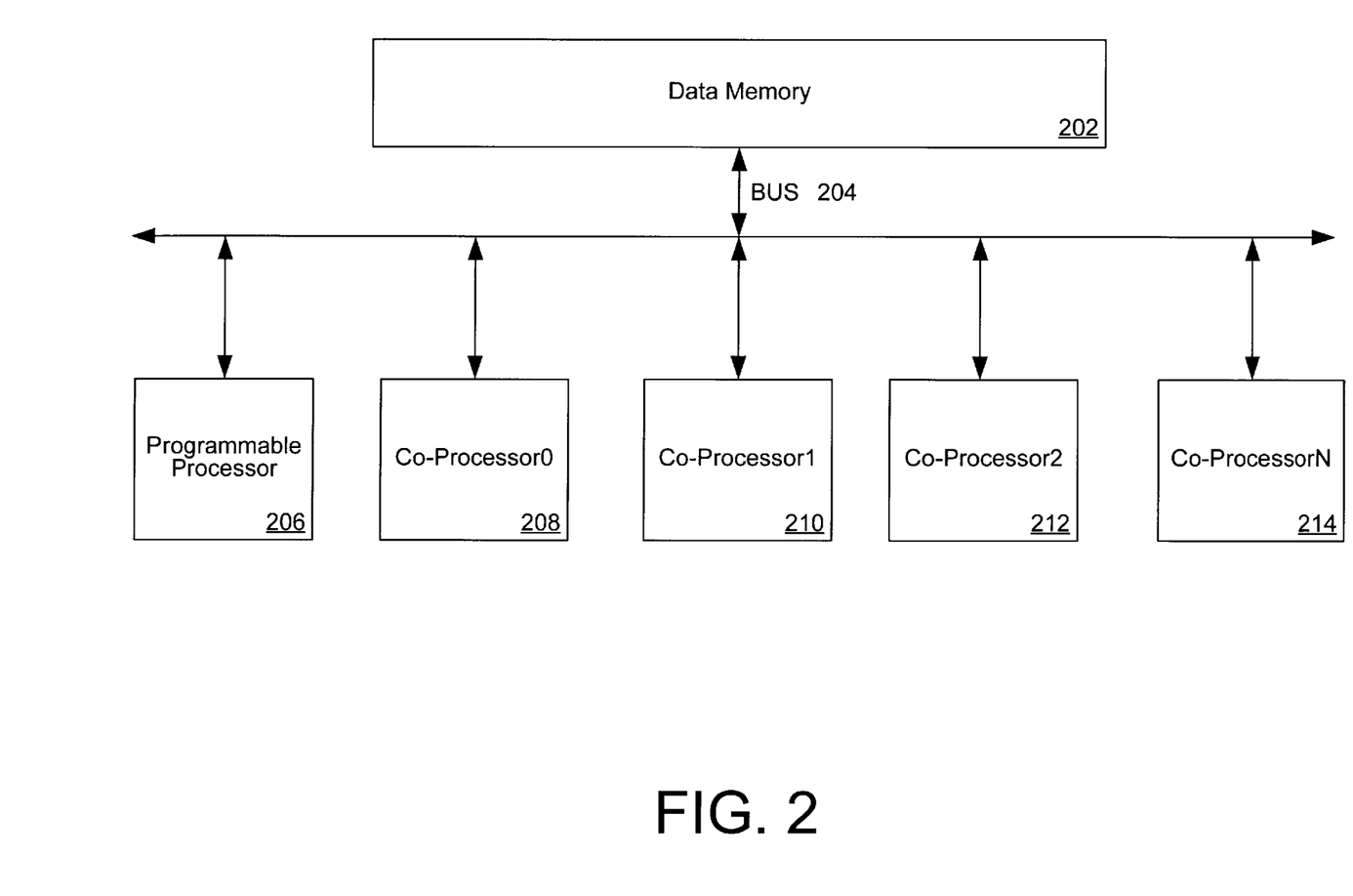
FIG. 2 illustrates a block diagram of an exemplary data memory architecture shared among a plurality of processors according to a preferred embodiment of the present invention.

FIG. 2 illustrates a simple block diagram of a memory and processor architecture. The processors can be classified as either a programmable processor 206 and a co-processor. The programmable processor 206 serves as a general purpose signal processor. This processor is augmented by a plurality of co-processors labeled co-processor-0 208, co-processor-1 210, co-processor-2 212, and so on through co-processor-N 214. These co-processors may perform specialized tasks such as graphics processing, floating point processing, DMA transfers, motion compensation, and many others. A bus 204 couples the programmable processor 206 and the co-processors to a data memory.

Figure 3:
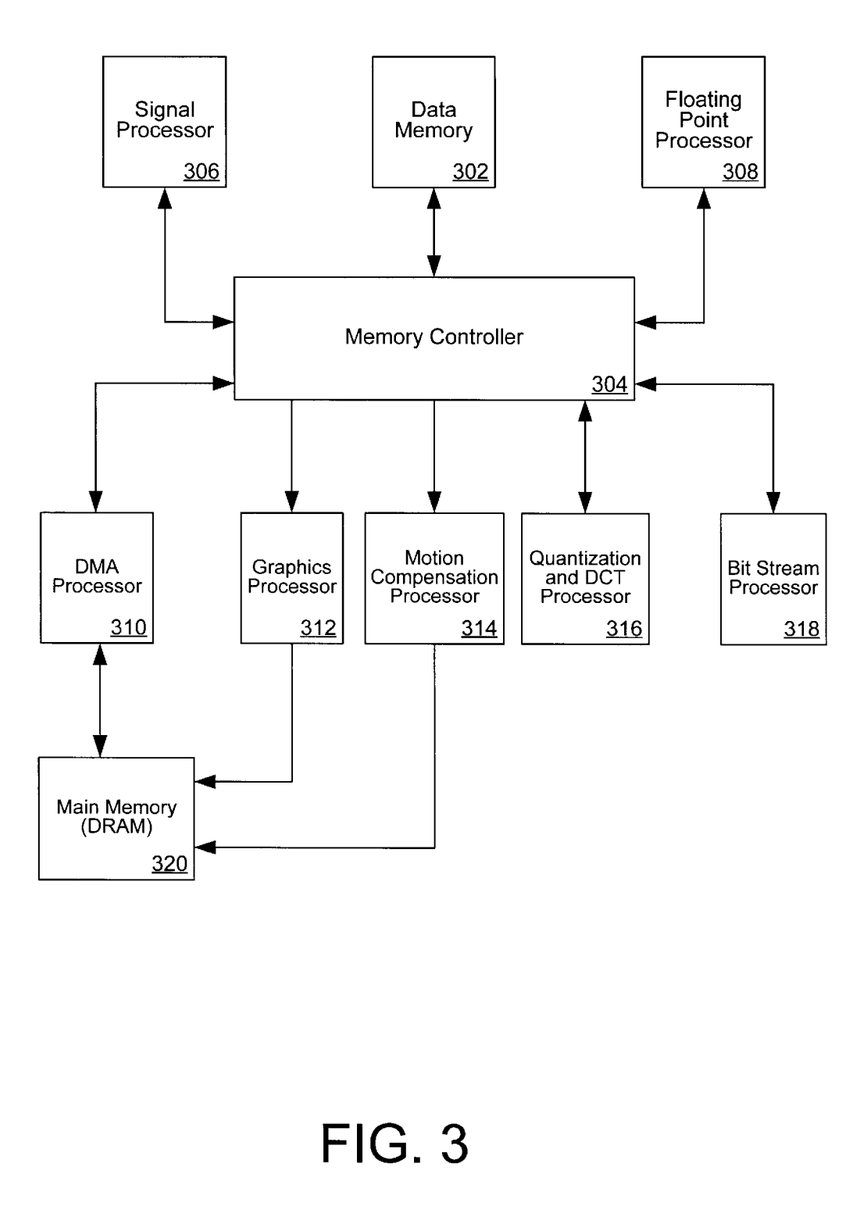
FIG. 3 illustrates a block diagram of an exemplary media processor in a computer system sharing a single data memory among memory client processors.

FIG. 3 illustrates a more detailed block diagram of an exemplary data memory architecture shared among a plurality of processors according to a preferred embodiment of the present invention. The data memory 302 is accessed through a memory controller 304, which interfaces data transfers between the data memory 302 and the processors. The memory controller 304 also arbitrates access to the data memory 302 among the processors. The data memory 302 is preferably implemented as a static RAM (SRAM). Exemplary processors sharing access to the data memory 302 and coupled to the memory controller include a signal processor (SP) 306, a floating point processor (FPU) 308, a direct memory access (DMA) processor 310, a graphics processor (GP) 312, a motion compensation unit (MP) 314, a quantization and discrete cosine transform processor (QP) 316, and a bit stream processor (BP) 318. According to a preferred embodiment of the present invention, the processors and the data memory 302 are all disposed on a single integrated chip (IC). Although a co-processor in the present invention is described as a "processor," those skilled in the art will undoubtedly appreciate that it is synonymous with and used interchangeably with the well known term "unit" herein.

The present invention may also be implemented in a variety of ways. For example, the processors and/or the data memory 302 may be disposed in different ICs and coupled through a bus such as a peripheral component interconnect (PCI) bus. In addition, the data memory of the present invention can be implemented by using a variety of RAMS such as dynamic RAM (DRAM), SDRAM, and the like.

With reference still to FIG. 3, the signal processor 306 is a general purpose processor capable of running general purpose applications. That is, the signal processor 306 is a programmable processor capable of executing a typical computer program. Essentially, it consists of an instruction memory for storing instructions, an execution unit for interpreting the instructions, and a datapath for performing logical and arithmetic operations according to the instructions.

The signal processor 306 is augmented in its processing tasks by a number of co-processors or functional units which perform specific functions such as graphics, video, audio, and others. The co-processors relieve the signal processor's processing load and speed up the overall performance of the system. For example, the DMA processor 310 transfers blocks of data between the data memory 302 and a main memory 320. It does not perform any arithmetic or logical operations on the data. The graphics processor 312 performs scan conversion of output primitives into a pixel map and raster operations of moving, copying, and modifying pixels for display on a display screen. In addition, the floating point processor 308 augments the signal processor 306 by performing floating point arithmetic operations such as add, subtract, multiply, and divide.

To assist the signal processor 306 in MPEG video and audio data processing, the present invention utilizes a quantization and discrete cosine transform processor (QP) 316, a bit stream processor (BP) 318, and a motion compensation processor (MP) 314. In MPEG video processing, the BP 318 decodes codewords or bit strings assigned to image symbols to reduce the number of bits needed to code an image as in decoding a Huffman code. This is called variable length or entropy decoding.

The QP 316 performs quantization and discrete cosine transformation (DCT). In the quantization process, the QP 316 converts an analog signal into a digital format. In the DCT process, the QP 316 converts a block of pixel values into independent coefficients and thereby packs the block of image signals into a small number of coefficients. Finally, the MP 314 performs coding of video segments in relation to their displacements in successive frames.

All processors, except the graphics processor 312 and motion compensation processor 314, can read from and write to the data memory 302. The graphics processor 312 and motion compensation processor 314 only read from the data memory 302. Instead, these co-processors write to a memory unit such as the main memory 320 or a frame buffer for eventual display to a screen.

Each of the processors in FIG. 3 is coupled to the data memory 302 through an internal bus and a memory controller 304, which controls the access to the data memory. The DMA processor 310 is also coupled to a main memory 320 and is capable of accessing the main memory 320 directly. Similarly, the graphics processor 312 and motion compensation processor 314 may be coupled to the main memory 314 or a frame buffer for writing into these memory units.

These processors share the data memory through the memory controller. The memory controller provides the interface between the data memory and the memory clients (i.e., processors or functional units). It also arbitrates access to the data memory among the processors. Memory clients make read and write requests to the data memory through the memory controller. The memory controller converts these requests from the memory clients into appropriate control signals and passes data between memory clients and the data memory. Client processors transmit their requests to the memory controller. The arbitration logic in the memory controller evaluates the requests and selects a processor as a memory master. Although the present invention employs these media co-processors, other processors such as data communication and networking processors with deterministic characteristics, are equally suitable for use as co-processors in the present invention.

Figure 4:
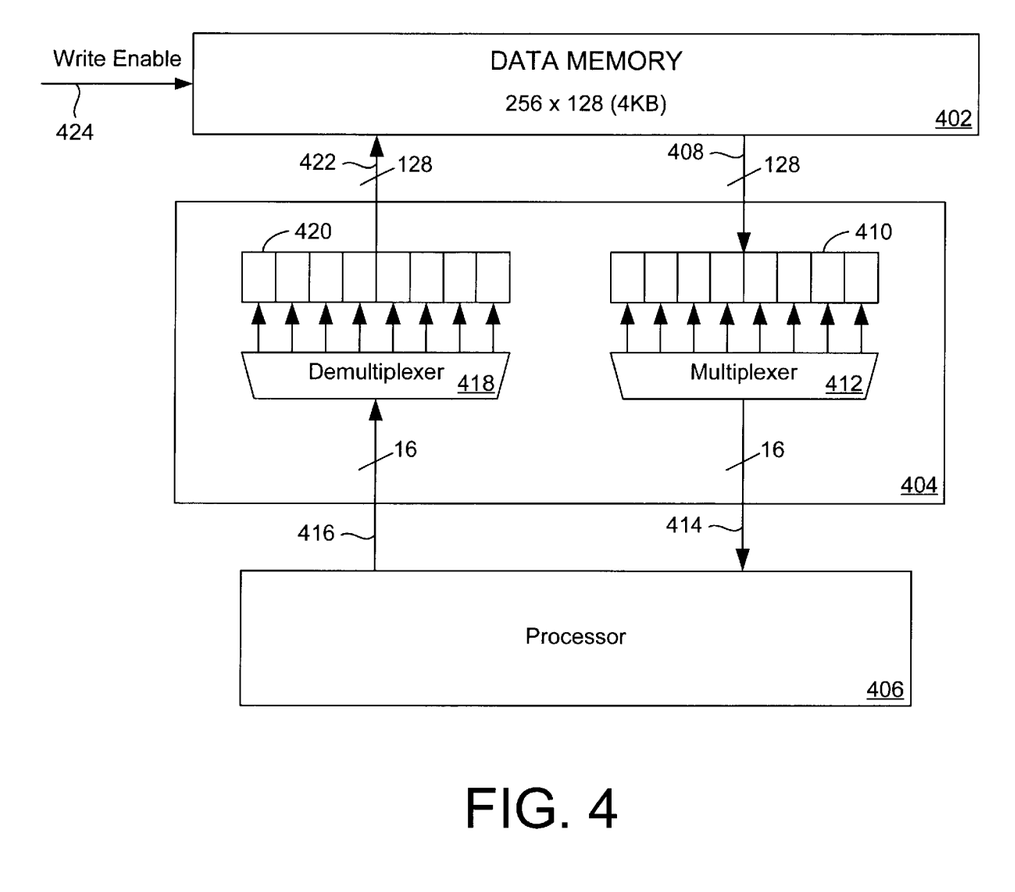
FIG. 4 illustrates a block diagram of an exemplary memory controller for interfacing a processor and a data memory.

FIG. 4 illustrates a block diagram of an exemplary memory controller 404 for interfacing a processor 406 and a 4 KB data memory 402. The memory controller 404 is coupled between the data memory 402 and the processor 406. A read data bus 408 and a write data bus 422, both comprised of 128 lines, couples the memory controller 404 to the data memory 402. Within the interface circuit, a 128-bit wide read register (i.e., buffer) 410 is coupled to the read data bus 408 and receives 128 bits for storage from the data memory 402 in one clock cycle when a write enable signal 424 is not asserted. These 128 bits stored in the read register 410 are accessible in a specified number of bits per clock cycle such as 8, 9, 12, 16, or 32, 64, or other number of bits per clock cycle. The specified number of bits per clock cycle is a subset of the 128 bits. In the present illustration, the multiplexer 412 selects an exemplary 16 bit word from the register and routes the selected word to the processor 406 through an internal bus 414 for processing. During the next clock cycle, the multiplexer 412 selects another 16 bit word and routes it to the processor 406. It should be noted that the access to 16 bit words occurs in a sequential order according to an endian order employed in a system.

The endian order refers to a byte ordering mode utilized in a memory system. Byte ordering within a larger data size such as a 128-bit word may be configured in either big-endian or little-endian order. Endian order refers to the location of byte 0 within a multi-byte data. A memory system such as a data memory according to the present invention may be configured as either a big-endian or little-endian system. For example, in a little-endian system, byte 0 is the least significant (i.e., rightmost) byte. On the other hand, in a big-endian system, byte 0 is the most significant (i.e., leftmost) byte. In the present invention, an exemplary processor uses byte addressing for a doubleword access, which is aligned on a byte boundary divisible by eight (i.e., 0, 8, 16, . . . 56). Hence, a 64-bit doubleword loaded into a register in a processor is byte-aligned in either a big-endian or a little-endian mode. For a little-endian mode processor, the starting byte for a vector to be extracted lies in the second vector register. Conversely for a big-endian mode processor, the starting byte for the vector resides in the first vector register.

With reference still to FIG. 4, the process of transferring the subsets of 128 bits continues until all 128 bits in the read register 410 have been loaded into the processor 406. Consequently, the processor 406 receives 16 bits of data per clock cycle over 8 clock cycles. In this configuration, the processor needs only one access to the data memory every 8 clock cycles to ensure real time performance. Although the present embodiment utilizes a bus width of 128 bits and 16 bit word access, it should be appreciated that the bus width and access word size are adaptable to suit various other real time requirements of a processor.

With reference yet to FIG. 4, a write operation from the processor 406 to the data memory 402 proceeds in a similar manner. Typically, data generated by a processor per clock cycle is much less than the bus width of 128 bits, usually a subset of 128 bits such as 8, 9, 12, 16, 32, or 64 bits. In the present embodiment, the processor 406 processes data and generates an exemplary 16 bit data for storage into the data memory 402 per clock cycle. Within the controller circuit, a demultiplexer 418 receives the 16 bit data from the processor 406 through an internal bus 416 and routes the 16 bit word into one of the word slots in a 128-bit write register 420 within the memory controller 404. During the next clock cycle, another 16 bit word is generated by the processor 406 and is loaded into the write register 420 through the demultiplexer 418. The 16-bit words are stored, preferably in a sequential order depending on the endian order of the data memory, in the 128-bit write register 420. This process continues for eight clock cycles until the 128-bit write register 420 becomes full. Then, the contents of the write register 420 with its 128 bits of useful data are written to the data memory 402 when the write enable signal 424 is asserted. In this manner, the processor needs only one access to the data memory for every 8 clock cycles. Although the memory controller 404 is depicted as a separate unit, it should be noted that it is readily adaptable to be incorporated into the data memory 402 or the exemplary processor 406.

It should be noted that the exemplary processor 406 both reads and writes to the data memory. However, not all processors need to read and write to the data memory 402 as described below. For these processors, only the portion of the memory controller 404 necessary for reading or writing from or to the data memory 402 may be implemented.

In a preferred embodiment, the data memory of the present invention operates without address translation. However, the data memory may also be implemented with address translation using well known address translation algorithms.

The shared memory architecture described thus far requires an access arbitration scheme among the processors to ensure real time performance requirements of each of the processors accessing the shared memory. The present invention meets this real time objective by providing the processor with an access bandwidth to the shared memory that is greater than the sum of all the bandwidth requirements of each of the processors. Specifically, the access to the data memory is time multiplexed in sufficient bandwidth per access time among the various processors according to an arbitration scheme derived from deterministic characteristics of the processors.

Time multiplexed access among the processors can be regulated and prioritized because the behavior of all the processors are deterministic, i.e., their data transfer characteristics and active states are known in advance. First, the real time processing requirements of each of the processors in the present invention are deterministic. That is, the bandwidth of each of the processors required for real time processing can be computed based on a target data transfer rate for a processor. Table 1 shows the bandwidth required for each of the co-processors depicted in FIG. 3. These peak rates are obtained by working backwards from the requirement of an applicable specification or a standard.

TABLE 1

|  | Peak transfer rate (clocks per output) | Typical transfer rate (clocks per output) | Required bandwidth in 128 bit DMEM (bits per clock) |
| --- | --- | --- | --- |
| DMA read/write | 4/16 | 1/16 | 32 |
| BP read/write | 2/16 | 1/16 | 16 |
| QP coefficient read | 2/16 | 1/16 | 16 |

TABLE 1-continued

|  | Peak transfer rate (clocks per output) | Typical transfer rate (clocks per output) | Required bandwidth in 128 bit DMEM (bits per clock) |
|---|---|---|---|
| QP quantization read | 1/16 | 1/16 | 8 |
| QP quantization write | 2/16 | 1/16 | 16 |
| GP read | 4/16 | 1/16 | 32 |
| Total | 17/16 | 7/16 |  |

Second, the present invention takes advantage of another deterministic character of the co-processors in that not all co-processors are active at the same time. For instance, some co-processors are used in MPEG while some others are used in graphics, and still some others in audio. But not all of the co-processors are used all the time. For example, in MPEG video processing, BP, QP, and MP are active while GP and floating point processor are inactive. In MPEG audio, the BP and FPU processor are active while other processors are inactive. In graphics processing, only graphics processor and FPU are active. Table 2 summarizes the active states of various co-processors for these media processes.

TABLE 2

| Co-processor | MPEG video | MPEG audio | Graphics |
|---|---|---|---|
| BP | Active | Active | Inactive |
| QP | Active | Inactive | Inactive |
| MP | Active | Inactive | Inactive |
| GP | Inactive | Inactive | Active |
| FPU | Inactive | Active | Active |

Third, the access pattern of each of the processors are highly regular because the processors operate on a stream of data, in a linear and contiguous manner. For example, in decompressing MPEG bit stream, BP accesses data in a linear fashion, starting at a first byte of a data block through all the bytes in the block. Similarly, QP accesses entire 8×8 DCT block of data in a linear manner.

Finally, the FPU is different from other co-processors in that it shares the SP instruction stream. That is, it gets its data from loads and stores through the SP instruction stream. The address for accessing data in a data memory is supplied by the SP. Hence, even though FPU has a separate data connection to the data memory, from a data memory's point of view, it appears to share the SP time slots in accessing the data memory.

Based on these observations, the present invention provides each processor access to a much larger bandwidth of a data memory per access. The size of the data memory word bandwidth per access is adapted to be large enough to allow a processor to process all the data accessed until its next access. In the preferred embodiment of the present invention, the bandwidth of data memory access is 128 bits per clock cycle. This increased granularity of the data access size enables time multiplexed access for each processors to the data memory.

The large access bandwidth of 128 bits is accessible to the processors in a single clock cycle within a larger cycle of 8 clocks or states. In the preferred embodiment of the present invention, a counter in the form of a state machine repeatedly generates 8 clock s (i.e., states) per cycle. These clocks are used to control and regulate the timing and operation of the components within the present invention. The use of a counter or a state machine to generate various clock cycles is well known in the art Although the present invention employs an 8 state counter, it is readily adaptable for various other number of clocks or states per cycle.

The access to the individual clock cycles within the 8 states or clocks are regulated according to an arbitration scheme based on the empirical behavior of the processors accessing the data memory. Of all the processors in the present invention, the DMA processor is unique in that it moves blocks of data between main memory and the data memory. Since the main memory is typically off-chip DRAM and the data memory is on-chip SRAM according to one embodiment, the transfer of data between the main memory and the data memory is usually much slower than a transfer between a processor and data memory and is much less subject to arbitrary access patterns. For example, MPEG decoding may require the DMA processor to move blocks of compressed data into the data memory to allow BP or QP to process the data.

Another important characteristic of the DMA processor is that it does not monopolize access to the data memory indefinitely to the exclusion of all other processors. This is based on the very purpose of DMA in the computer architecture, which is to transfer data for use by other processors. The other processors depend on the DMA processor to transfer data for their use and they do not need more data than they can process. Hence, the DMA processor merely needs to transfer data to satisfy this minimum rate. Hence, in this deterministic and self-limiting environment, the DMA transfers can be controlled without excluding other processors from accessing the data memory.

For these reasons, the highest priority data memory master, in the preferred embodiment of the present invention, is the DMA processor. It preempts all other processors. Hence, the DMA processor is not stallable once it has arbitrated for the data memory bus for a given time slot or clock cycle.

The programmable signal processor, on the other hand, typically runs a fairly arbitrary program. Much like a conventional microprocessor, the signal processor reads and writes data of various sizes. Although the peak bandwidth is known, the signal processor's access pattern is not predictable because it depends largely on the software running on the signal processor. Hence, the signal processor is the memory master of default and takes the idle time slots when other processors are not active.

Accordingly, in the access scheme of distributing access time slots to various processors, the signal processor loads or stores data during idle time slots or slices like conventional loads and stores. For instance, whenever the signal processor attempts to execute a load or store instruction when another processor is accessing the data memory, a stall condition is generated preventing the signal processor from accessing the data memory until an idle slot opens up. That is, when a collision occurs between the signal processor and another processor, the signal processor stalls and accesses the data memory on the next available collision-free slot. Hence, the signal processor is given lower priority than other processors which have fixed time requirements.

Figure 5:
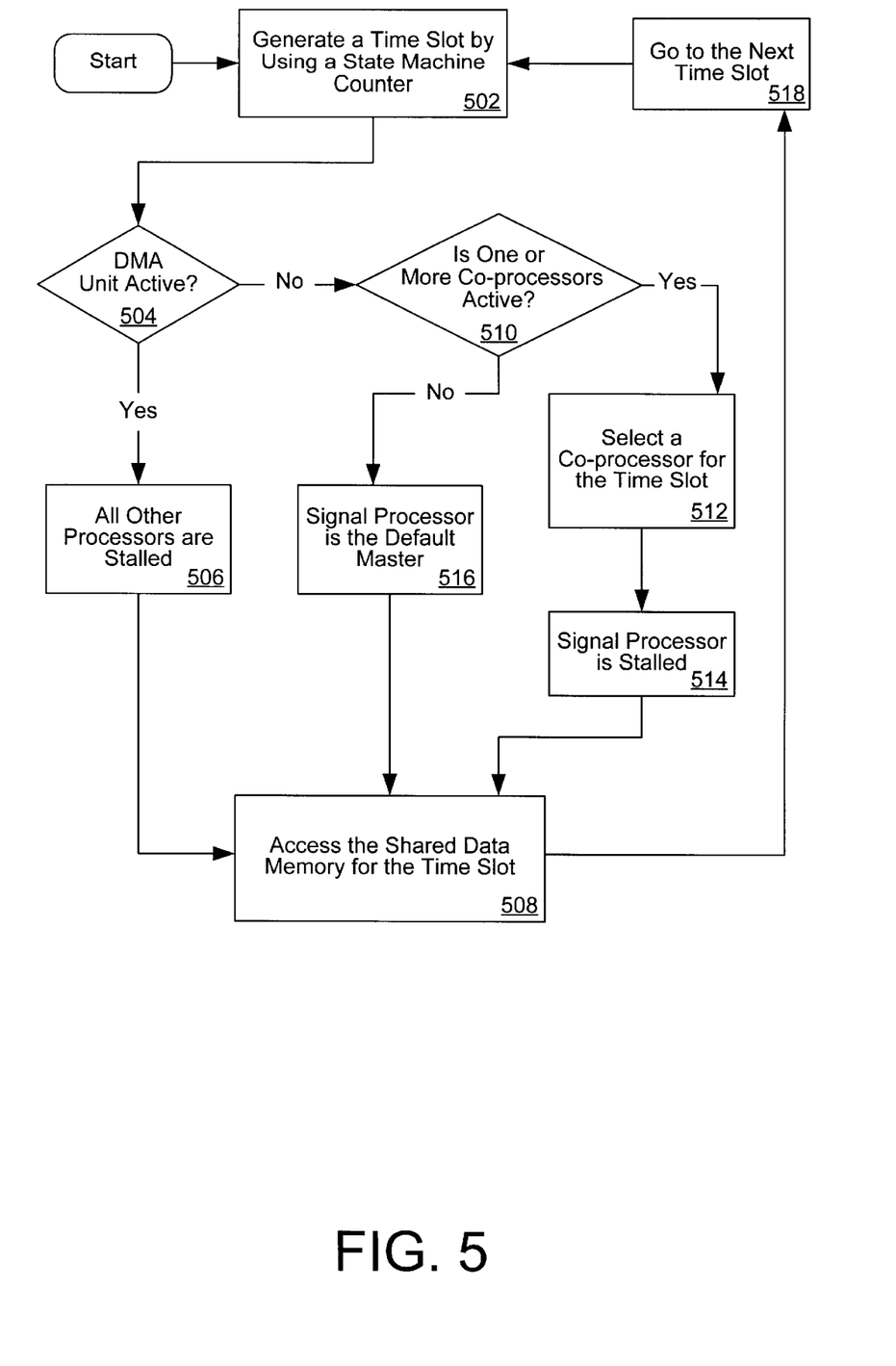
FIG. 5 illustrates a flow diagram of steps involved in arbitrating access to a data memory among processors.

FIG. 5 illustrates a flow diagram of steps involved in arbitrating access to a data memory among processors. First in step 502, a time slot is generated using an exemplary state machine counter. Then each of the processors are tested to determine its active state, i.e., whether it needs to access the data memory. If DMA unit is active as in step 604, then the DMA unit is allowed to access the shared data memory for the time slot in step 508. All other processors are stalled as in step 506. If DMA unit is not active and one or more co-processors are active in step 510, then a co-processor is selected from the active co-processors according to a priority established for the time slot in step 512. The selected co-processor is then allowed access to the data memory as in step 508. During this time, the signal processor is stalled in step 514. If no other processor is active, the signal processor becomes the default memory master as in step 516 and is allowed access to the data memory in step 508. The process repeats for the next time slot as in steps 518 and 502.

Figure 6:
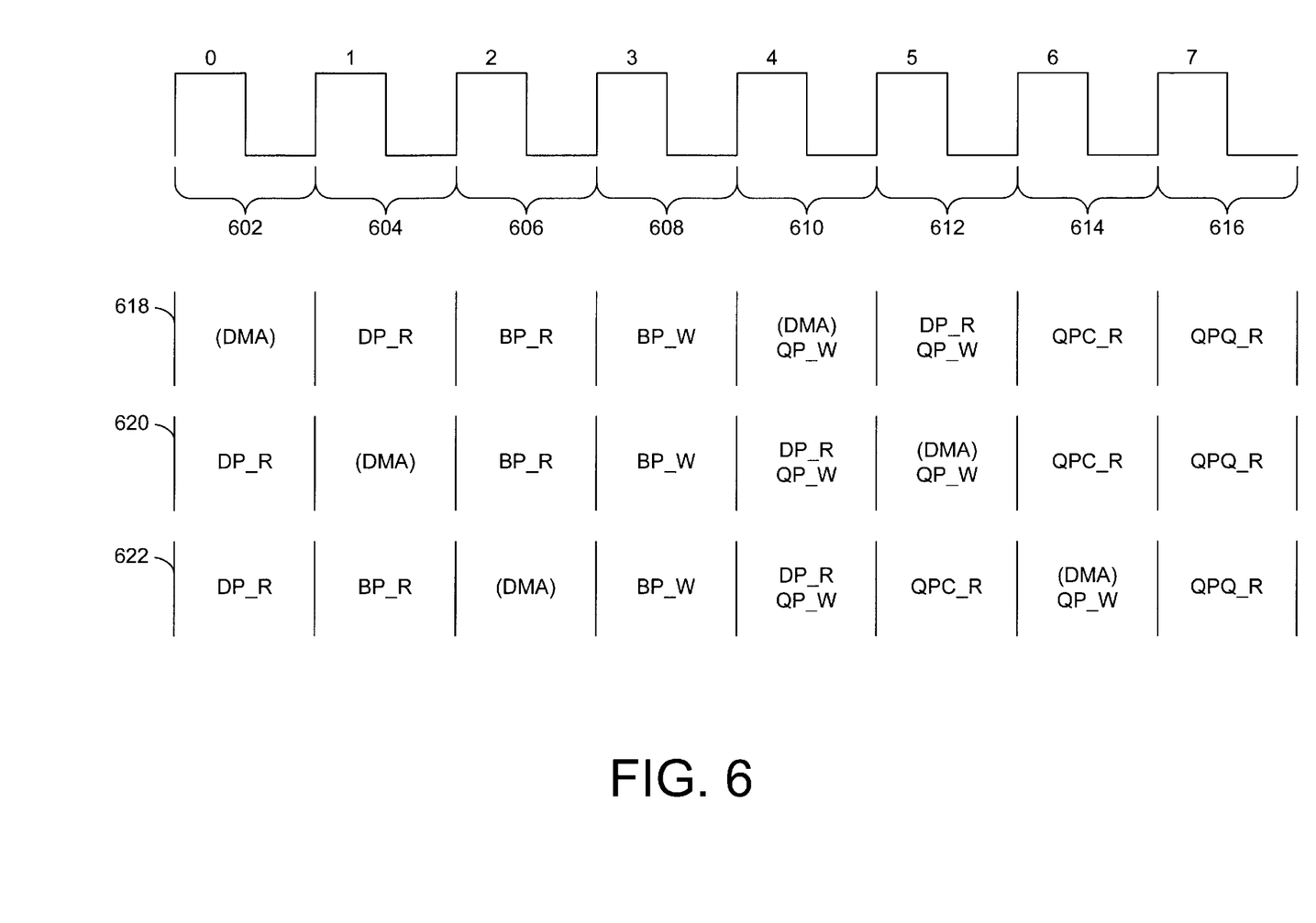
FIG. 6 illustrates an exemplary time slot allocation scheme for data memory masters and the different access patterns in case of a DMA preemption.

FIG. 6 illustrates an exemplary time slot allocation scheme for data memory masters and the different access patterns in case of a DMA preemption. The time slot allocation consists of 8 time slots from 0 to 7, 602 to 616. In this embodiment, a slot designator, implemented through a state machine, selects a data memory master among the processors based on the counter values from 0 to 7 and 3 exemplary access patterns 618, 620, and 622. The access patterns 618, 620, and 622 are comprised of slots for DMA processor (DMA), digital processor read (i.e., graphics processor read) (DP_R), bit stream processor read (BP_R), bit stream processor write (BP_W), quantization processor write (QP_W), quantization DCT processor read (QPC_R), and quantization processor read (QPQ_R).

The counter values from 0 to 7 in FIG. 6 correspond to the 8 time slots 602 to 616. In the present allocation scheme, a 3 state state machine keeps track of the slot pattern currently in use. QP, BP, and DPO use the data memory when the counter points to it respective slot as shown in access patterns 618, 620, and 622. The "(DMA)" slots are used to synchronize the DMA requests to one of the access patterns 618, 620, and 622. When the DMA processor preempts, the slot designator may switch to one of the three patterns to accommodate the DMA processor into its slot. The only stalls will be during DMA processor startups when all the other masters will be stalled. The stalls may be more than 1 clock cycle depending on the DMA word alignment.

With reference still to FIG. 6, upon starting, the DMA processor takes up a QP_W slot. In this case, QP_W shares the DP_R slot because QP_W is not very frequent, 1/16 in the peak case. DP has 3/16 accesses to the data memory and may be stalled for 4 cycles in every 16 cycles. For graphics processing only mode, DP is not stalled because QP is inactive. It should be noted that the time slots are free for SP and FPU accesses when the slots are not being-used by their owners. Given the access patterns and states, a memory controller can be readily made to implement the control logic regulating the access to the data memory among the various processors.

In one embodiment of the present invention, the exemplary arbitration scheme shown in FIG. 6 is implemented in a controller to regulate access to the data memory. The controller exists within the memory controller along with the interface circuit. In an alternative embodiment, the controller is implemented outside of the memory controller. In either case, the controller receives signals from active processors requesting access to the data memory. In response, the controller selects a processor to access the data memory for a given time slot by generating an enable signal for the selected processor. The processor thus selected is then allowed access to the data memory through the time slot.

Figure 7:
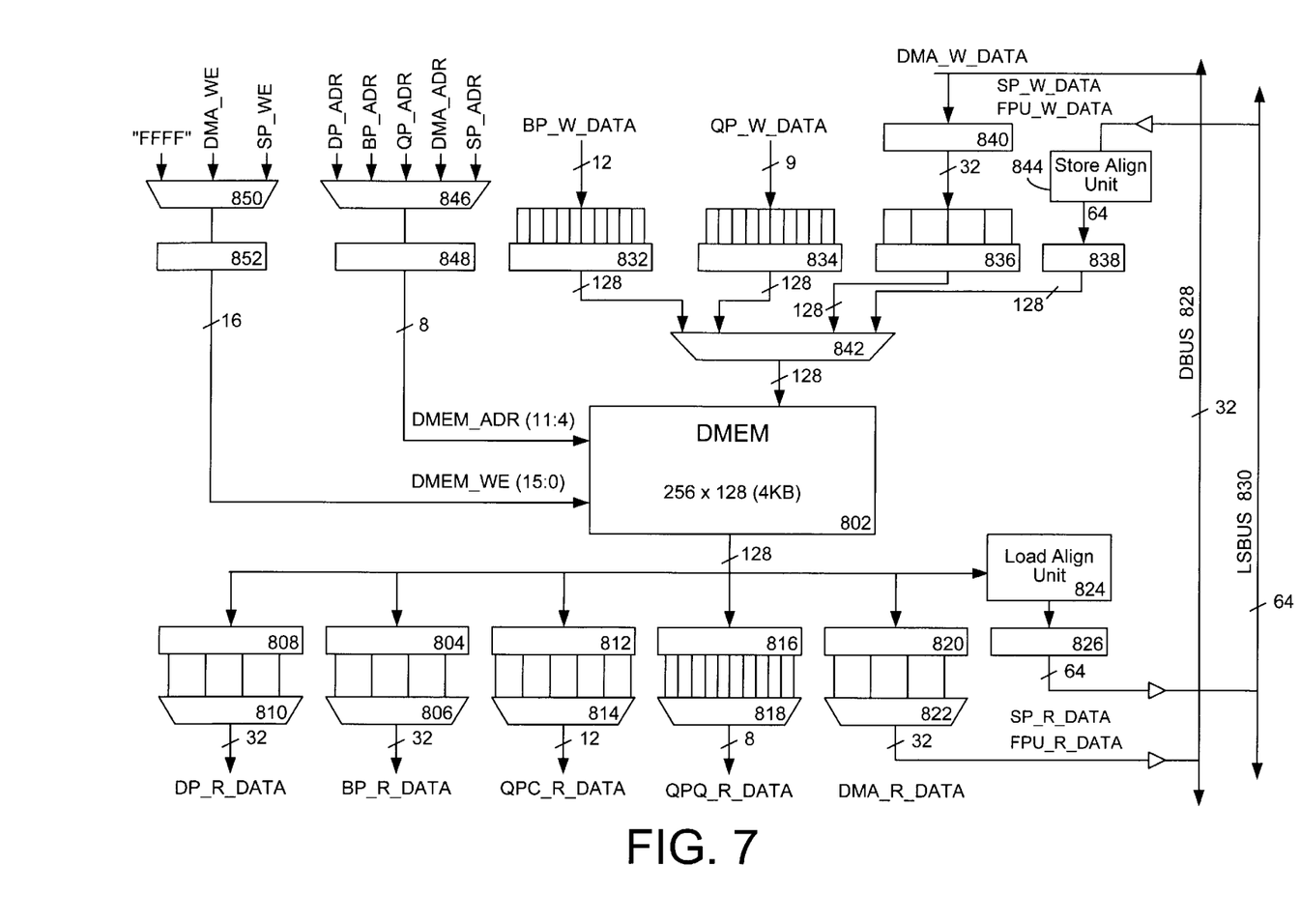
FIG. 7 illustrates a data memory block containing a data memory and exemplary interfaces to processors according to one embodiment of the present invention.

FIG. 7 illustrates a data memory block containing a data memory (DMEM) 702 and exemplary interfaces to processors according to one embodiment of the present invention.

For read interface, the DMEM 802 communicates with the processors through a plurality of ports, preferably one port for each processor. A port is comprised of a 128 bit read register and a multiplexer. The multiplexer receives a subset of the 128 bits from the read register in one clock cycle and over a plurality of clock cycles transmits the entire 128 bits to a processor. For example, the BP_R_DATA port receives 32 bits from a read register 804 through a multiplexer 806 per clock cycle and transmits them to a bit stream processor. In the next clock cycle, the next 32 bits in the read register 804 is selected by the multiplexer 806 and transmitted to the bit stream processor. In this manner, the entire 128 bits in the read register 804 is transmitted to the processor over 4 clock cycles. Similarly, DP_R_DATA port receives 32 bits of data per clock cycle and transmits them to either a motion compensation processor or a graphics processor, which share a single port. QPC_R_DATA port receives 12 bits of data per clock cycle from its corresponding read register 812 through a multiplexer 814 and transmits it to a QP for DCT processing. QPQ_R_DATA port receives 8 bits per clock cycle and transmits them to the QP for quantization processing. DMA_R_DATA port receives 32 bits per clock cycles and transmits them to DMA unit through a DBUS 828. SP_R_DATA and FPU_R_DATA ports share a single port and receive 64 bits per clock cycle after a load alignment unit has extracted an aligned 64 bits of data from the 128 bits of data received from data memory. Since the alignment unit extracts 64 bits, these ports do not utilize a multiplexer. The data is then transmitted to SP or FPU through a load/store bus 830.

For write interface to the data memory, the DMEM 802 also communicates with the processors through a plurality of ports. A processor writes to a 128 bit write register through a multiplexer. In this process, only a small portion of the 128 bits are written. For example, BP_W_DATA port receives 12 bits of data per clock cycle from the bit stream processor and transmits them to a 128 bit write register 832. QP_W_DATA port receives 9 bits per clock from QP processor and transmits them to its 128 bit write register 834. DMA_W_DATA receives 32 bits per clock from DMA unit and transmits them to its 128 bit register 836. SP_W_DATA and FPU_W_DATA ports share a single write port and receive 64 bits from SP or FPU through the load/store bus 830. The store alignment unit 844 aligns the 64 bits for storage and transmits the aligned 64 bits to a write register 838, which duplicates the 64 bits to fill the 128 bit write register 838. Among these four write registers, a multiplexer 842 selects a register and routes the content of the selected register to the data memory 802.

The read and write operations are performed in sync with an addressing unit, which selects an address in the DMEM to write to or read from. The DMEM in the present embodiment is organized as 256×128-bit array, for a total of 4 KB. To address the 256 128 bit DMEM words, the address lines are 8 bits wide for selecting one of 256 addresses from DMEM. The address of the data in the data memory required by each active processor is selected by a multiplexer 846. The selected address is then latched onto an address register 848 and the address signal is applied to the DMEM 802 to enable correct read and write operations.

In the present embodiment, the data in the data memory is byte addressable. That is, any bytes in the 128 bit data memory bandwidth are selectable. The signal "FFFF" in hexadecimal numbers indicates all 16 bytes in the 128 bit data are to be selected. DMA_WE indicates write enable for DMA unit and SP_WE indicates write enable for SP. The byte addressing for the SP and DMA unit enables selection of specified bytes.

Sharing a single data memory among various processors in accordance with the present invention is substantially more cost efficient than having a dedicated memory resource for each of the processors. First, in the shared configuration, the processors use more of the memory resources of the integrated chip (IC). That is, by utilizing a single data memory for all the processors, the data memory is used more since no dedicated memory exists. Additionally, since IC resources such as memory or RAM tend to be more efficient at larger sizes, the shared memory configuration allows for a larger data memory for all the processors. This is because IC resources such as memory or RAM tend to be more cost efficient at larger sizes. Further, the larger memory size is possible due to the savings in die spaces that otherwise would be required for supporting circuitry such as address decoders and sensing amplifiers for each of the processors in a dedicated memory architecture.

The present invention, a preemptive time multiplexed shared memory access system and method, is thus described. While the present invention has been described in particular embodiments, it should be appreciated that the present invention should not be construed as being limited by such embodiments, but rather construed according to the claims below.

What is claimed is:

1. In a computer system, a method for sharing access to a data memory among processors comprising, the steps of:
   receiving an active signal for accessing the data memory from a plurality of processors, one active signal per processor, wherein the data memory is accessible to the processor for transferring an N-bit wide data to or from the data memory;
   selecting a processor as a memory master among the processors asserting the active signals to the data memory; the processors further including:
   a signal processor;
   a plurality of co-processors, wherein the co-processors include a direct memory access (DMA) processor;
   selecting the DMA processor as a bus master if the DMA processor is active;
   selecting a co-processor as the bus master from the plurality of co-processors if the DMA processor is not active;
   selecting the signal processor as the bus master if neither the DMA processor nor any of the co-processors is active; and
   transferring the N-bit wide data between the selected processor and the data memory in a time slot defined by a clock; the transferring step further comprises the steps of:
   a) loading the N-bit wide data into an N-bit wide register;
   b) reading, by the selected processor, a subset of N-bit wide data during the clock cycle through a multiplexer until all N-bits have been read from the register over a plurality of clock cycles.

2. The method as recited in claim 1, wherein the transferring step further comprises the steps of:
   transferring a subset of the N-bit wide data into the N-bit wide register in a clock cycle until all N-bits have been loaded into the register over a plurality of the clock cycles; and
   writing the N-bit wide data in the register into the data memory.

3. The method as recited in claim 1, wherein the selecting step further comprises the steps of:
   selecting a co-processor as the bus master from the plurality of co-processors; and
   selecting the signal processor as the bus master if none of the co-processors are active.

4. The method as recited in claim 1, wherein the co-processors include a graphics processor, a bit stream processor, a quantization processor for performing quantization and discrete cosine transform, and a floating point processor.

5. The method as recited in claim 4, wherein the co-processors further include a motion compensation processor sharing a read access to the data memory with the graphics processor.

6. The method as recited in claim 5, wherein N is 128.

7. The method as recited in claim 6, wherein the time slot is generated by a state machine counter.

8. The method as recited in claim 7, wherein the state machine counter repeatedly generates a cycle of M states, from 0 to M−1, one state for each time slot.

9. The method as recited in claim 8, wherein M is 8.

10. The method as recited in claim 9, wherein the 8 states define a bus master selection pattern wherein:
    the state 0 is assigned to the DMA processor;
    the state 1 is assigned to the graphics processor for reading from the data memory;
    the state 2 is assigned to the bit stream processor for reading from the data memory;
    the state 3 is assigned to the bit stream processor for writing to the data memory;
    the state 4 is assigned to the DMA processor for transferring data to and from the data memory and to the quantization processor for writing to the data memory, wherein the DMA processor preempts the quantization processor;
    the state 5 is assigned to the graphics processor for reading from the data memory and to the quantization processor for writing to the data memory, wherein the graphics processor preempts the quantization unit;
    the state 6 is assigned to the quantization processor for performing discrete cosine transformation for reading from the data memory; and
    the state 7 is assigned to the quantization processor for performing quantization for reading from the data memory.

11. The method as recited in claim 9, wherein the 8 states define a bus master selection pattern wherein:
    the state 0 is assigned to the graphics processor for reading from the data memory;
    the state 1 is assigned to the DMA processor for transferring the data to and from the data memory;
    the state 2 is assigned to the bit stream processor for reading from the data memory;
    the state 3 is assigned to the bit stream processor for writing to the data memory;
    the state 4 is assigned to the graphics processor for reading from the data memory and to the quantization processor for writing to the data memory, wherein the graphics processor preempts the quantization unit;
    the state 5 is assigned to the DMA processor for transferring data to and from the data memory and to the quantization processor for writing to the data memory, wherein the DMA processor preempts the quantization processor;
    the state 6 is assigned to the quantization processor for performing discrete cosine transformation for reading from the data memory; and the state 7 is assigned to the quantization processor for performing quantization for reading from the data memory.

12. The method as recited in claim 9, wherein the 8 states define a bus master selection pattern wherein:

the state 0 is assigned to the graphics processor for reading from the data memory;

the state 1 is assigned to the bit stream processor for reading from the data memory;

the state 2 is assigned to the DMA processor for transferring the data to and from the data memory;

the state 3 is assigned to the bit stream processor for writing to the data memory;

the state 4 is assigned to the graphics processor for reading from the data memory and to the quantization processor for writing to the data memory, wherein the graphics processor preempts the quantization unit;

the state 5 is assigned to the quantization processor for performing discrete cosine transformation for reading from the data memory;

the state 6 is assigned to the DMA processor for transferring data to and from the data memory and to the quantization processor for writing to the data memory, wherein the DMA processor preempts the quantization processor; and the state 7 is assigned to the quantization processor for performing quantization for reading from the data memory.

13. A computer system with a shared data memory among processors, comprising:

a data memory accessible during a time slot defined by a clock cycle;

a plurality of processors coupled to the data memory, a processor accessing the data memory in an N-bit data word; wherein the processors comprise:
a) a direct memory access (DMA) processor coupled between a memory controller and a main memory, the DMA processor transferring data between the main memory and the data memory during an active state;
b) a co-processor coupled to the memory controller, said co-processor accessing the data memory when the DMA processor is not active;
c) a signal processor coupled to the memory controller, a programmable processor accessing the data memory when all other processors are idle;

the memory controller, coupled between the data memory and the data processors, for interfacing the processors and the data memory, wherein the memory controller selects a processor among the plurality of processors to have exclusive access to the data memory during the time slot according to an arbitration pattern and transfers a specified N-bit data word between the data memory and the selected processor during the time slot, said memory controller coupled to the main memory;

an interface circuit comprising a) a plurality of N-bit registers for holding the N-bit data words for transfer between the processors and the data memory, at least one register for each processor; b) a plurality of multiplexers for transferring a subset of the N-bit data word in one clock cycle until all the data bits in the N-bits data word has been transferred, said multiplexers coupled to the N-bit registers, one multiplexer for each register.

14. The system as recited in claim 13, wherein the memory controller further comprises:

an interface circuit for interfacing data transfers between the processors and the data memory; and a controller circuit coupled to the interface circuit for arbitrating access among the processors to the data memory during the time slot.

15. The system as recited in claim 14, wherein N is 128.

16. The system as recited in claim 15, wherein the co-processor further includes a graphics processor, a bit stream processor, a quantization processor, a motion compensation processor, and a floating point processor.

17. The system as recited in claim 16, wherein the motion compensation processor and the graphics processor further share access to the data memory.

18. The system as recited in claim 17, wherein the memory controller generates the time slot using a state machine counter.

19. The system as recited in claim 18, wherein the memory controller generates a plurality of cycles comprised of M states, from 0 to M−1, one state for each time slot and M states per cycle.

20. The system as recited in claim 19, wherein M is 8.

21. The system as recited in claim 20, wherein the 8 states define the arbitration pattern wherein:

the state 0 is assigned to the DMA processor;

the state 1 is assigned to the graphics processor for reading from the data memory;

the state 2 is assigned to the bit stream processor for reading from the data memory;

the state 3 is assigned to the bit stream processor for writing to the data memory;

the state 4 is assigned to the DMA processor for transferring data to and from the data memory and to the quantization processor for writing to the data memory, wherein the DMA processor preempts the quantization processor;

the state 5 is assigned to the graphics processor for reading from the data memory and to the quantization processor for writing to the data memory, wherein the graphics processor preempts the quantization unit;

the state 6 is assigned to the quantization processor for performing discrete cosine transformation for reading from the data memory; and the state 7 is assigned to the quantization processor for performing quantization for reading from the data memory.

22. The system as recited in claim 20, wherein the 8 states define an arbitration pattern wherein:

the state 0 is assigned to the graphics processor for reading from the data memory;

the state 1 is assigned to the DMA processor for transferring the data to and from the data memory;

the state 2 is assigned to the bit stream processor for reading from the data memory;

the state 3 is assigned to the bit stream processor for writing to the data memory;

the state 4 is assigned to the graphics processor for reading from the data memory and to the quantization processor for writing to the data memory, wherein the graphics processor preempts the quantization unit;

the state 5 is assigned to the DMA processor for transferring data to and from the data memory and to the quantization processor for writing to the data memory, wherein the DMA processor preempts the quantization processor;

the state 6 is assigned to the quantization processor for performing discrete cosine transformation for reading from the data memory; and the state 7 is assigned to the quantization processor for performing quantization for reading from the data memory.

23. The system as recited in claim 20, wherein the 8 states define an arbitration pattern wherein:

the state 0 is assigned to the graphics processor for reading from the data memory;

the state 1 is assigned to the bit stream processor for reading from the data memory;

the state 2 is assigned to the DMA processor for transferring the data to and from the data memory;

the state 3 is assigned to the bit stream processor for writing to the data memory;

the state 4 is assigned to the graphics processor for reading from the data memory and to the quantization processor for writing to the data memory, wherein the graphics processor preempts the quantization unit;

the state 5 is assigned to the quantization processor for performing discrete cosine transformation for reading from the data memory;

the state 6 is assigned to the DMA processor for transferring data to and from the data memory and to the quantization processor for writing to the data memory, wherein the DMA processor preempts the quantization processor; and the state 7 is assigned to the quantization processor for performing quantization for reading from the data memory.

* * * * *

UNITED STATES PATENT AND TRADEMARK OFFICE
CERTIFICATE OF CORRECTION

PATENT NO. : 6,567,426 B1
DATED : May 20, 2003
INVENTOR(S) : Van Hook

It is certified that error appears in the above-identified patent and that said Letters Patent is hereby corrected as shown below:

Column 14,
Line 6, replace "claim 14" with -- claim 13 --

Signed and Sealed this

Sixth Day of July, 2004

JON W. DUDAS
*Acting Director of the United States Patent and Trademark Office*